Oct. 3, 1961 — T. J. WEIR — 3,002,595
FLUID COUPLING DEVICE
Filed Sept. 16, 1957 — 2 Sheets-Sheet 1

INVENTOR.
THOMAS J. WEIR.
BY Lockwood, Galt, Woodard & Smith.
ATTORNEYS.

Oct. 3, 1961 T. J. WEIR 3,002,595
FLUID COUPLING DEVICE
Filed Sept. 16, 1957 2 Sheets-Sheet 2
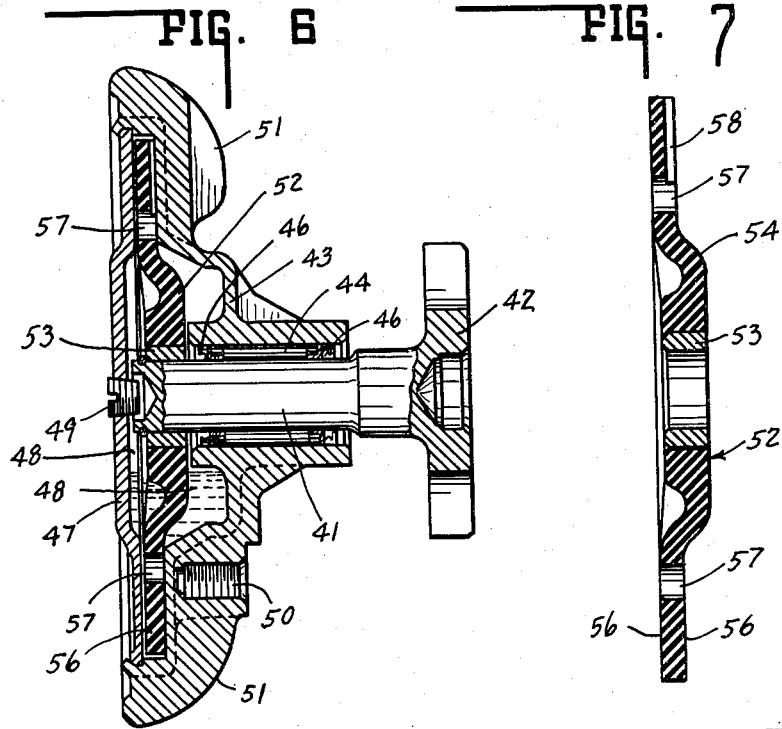
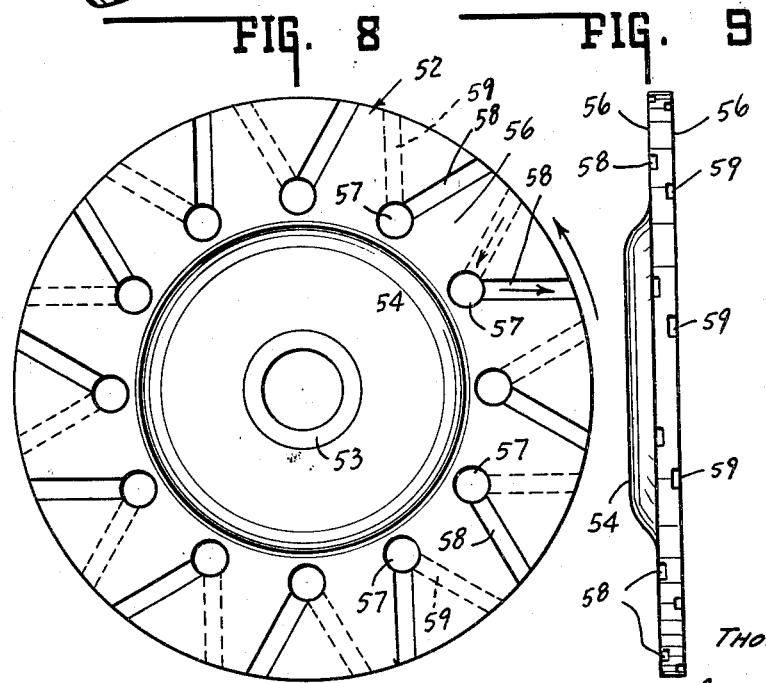
INVENTOR.
THOMAS J. WEIR.
Lockwood, Galt, Woodard & Smith
ATTORNEYS.

United States Patent Office 3,002,595
Patented Oct. 3, 1961

3,002,595
FLUID COUPLING DEVICE
Thomas J. Weir, Indianapolis, Ind., assignor to Schwitzer Corporation, Indianapolis, Ind., a corporation
Filed Sept. 16, 1957, Ser. No. 684,139
5 Claims. (Cl. 192—58)

This invention relates generally to fluid coupling devices and in particular to a mechanism of this type driven by an internal combustion engine and serving to drive the engine accessories, such as a radiator cooling fan, electric generator, air conditioner compressor, water pump or the like.

The power consumed by accessories of the type referred to above generally increases as the speed of the engine or driving means increases. The output requirements, however, of such driven accessories increases, if at all, at a rate much less than that resulting from the increase in speed of the driving means or engine. For example, if a radiator cooling fan is coupled directly to the engine, the power necessary to drive the fan increases approximately as the cube of the engine speed, whereas the speed of the fan required to cool the engine radiator does not increase in proportion to the engine speed.

In my co-pending applications: "Fluid Coupling Mechanism, Serial No. 582,187, filed May 2, 1956, now Patent Number 2,879,755, and "Fluid Coupling Mechanism," Serial No. 662,802, filed May 31, 1957, there is disclosed and claimed various forms of fluid coupling mechanisms adapted to reduce the power requirements of engine accessories and characterized by fluid passages formed in certain of the rotating parts to facilitate circulation of the friction fluid for dissipation of heat generated in the fluid.

The principal object of the present invention is to provide a fluid coupling mechanism of the type disclosed in my said co-pending applications, but characterized by the provision of fluid circulating grooves in the rotor or driving element.

A further object of the present invention is to provide a fluid coupling mechanism having a minimum number of coacting parts and which therefore lends itself to ease and economy of manufacture.

A further object of the present invention is to provide a fluid coupling mechanism in which the fluid circulating grooves or passages may be suitably molded into a plastic driving element or rotor.

The full nature of the invention will be understood from the accompanying drawings and the following description and claims:

FIG. 6 is a section taken axially through a modified form of the fluid coupling mechanism;

FIG. 7 is an enlarged sectional view of the rotor or driving element forming a part of the modified construction;

FIG. 8 is a front view of the rotor shown in FIG. 7; and

FIG. 9 is a profile view of the rotor shown in FIGS. 7 and 8.

Figure 1:
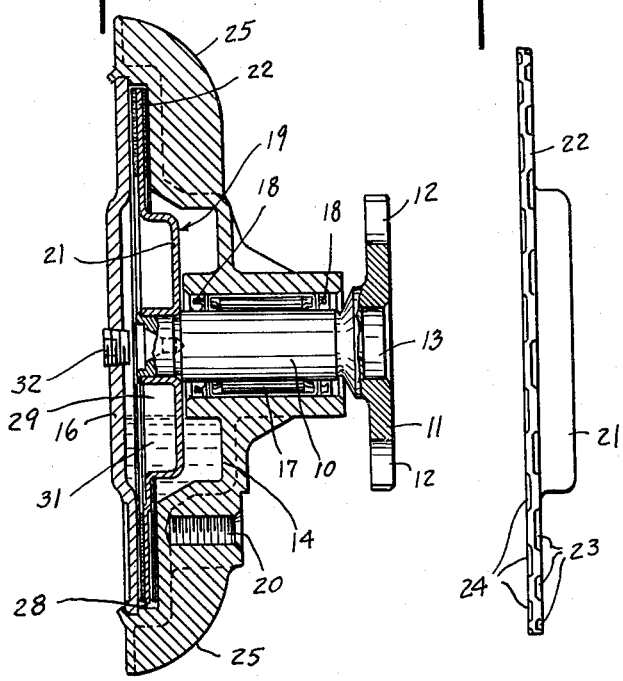
FIG. 1 is a cross section taken axially through a fluid coupling mechanism embodying the present invention.
Figures 2, 3:
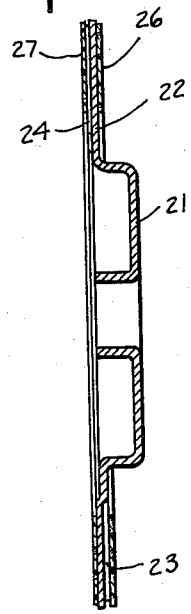
FIG. 2 is an enlarged profile view of the rotor or drive element.
FIG. 3 is an enlarged cross-section of the rotor assembly.
Figure 4:
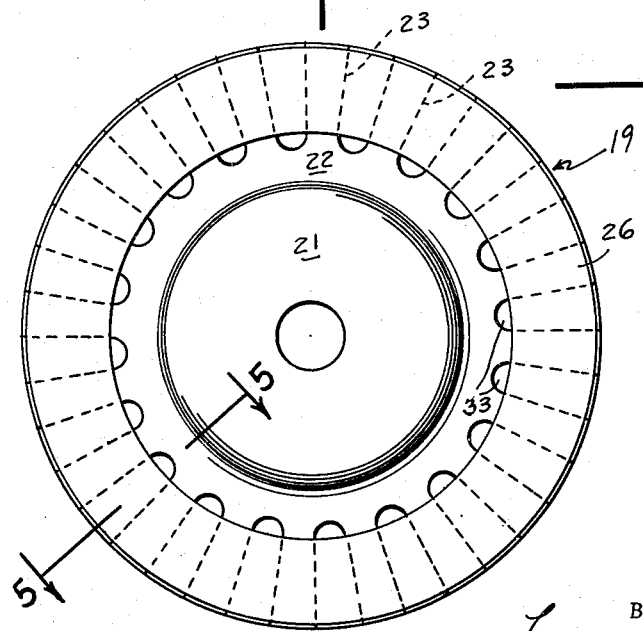
FIG. 4 is an enlarged front view of the rotor assembly.
Figure 5:
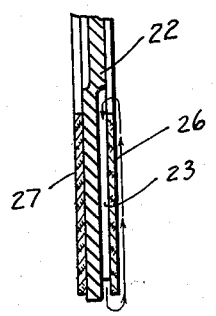
FIG. 5 is an enlarged fragmentary central view taken generally along the line 5—5 of FIG. 4.

Referring initially to FIGS. 1, 2, 3, 4, and 5, there is shown at 10 a drive element or spindle having a flared outer end 11 which is provided with a plurality of spaced, radial grooves 12 and a central recess 13. The flanged outer end of the spindle is adapted to be secured to the end of a drive pulley (not shown) by means of bolts which extend through the radial grooves. Conventionally, the pulley is mounted on a shaft which may extend into the recess 13, the pulley being driven by a belt extending from the engine drive shaft.

A housing for the torque transmission element is provided by a cup-shaped member 14, having its open end closed by means of a plate 16. Member 14 may be journaled for rotation upon the spindle by means of an anti-friction bearing 17, which may be of the needle type. Rotary seals 18 prevent entry of fluid into the bearing area and loss of fluid through the bearings. The cup-shaped member is provided with spaced, threaded openings 20 on its outer face adapted to receive mounting bolts (not shown) for securing fan blades to the housing. Fins 25 extend from the housing to aid in the dissipation of heat from the torque transmission area.

Rigidly secured to the reduced end of the spindle is a rotor 19 having an offset central element 21 and peripheral element 22. The rotor may be formed of steel or molded plastic, and as may best be seen in FIGS. 2 and 4, the element 22 of the rotor is provided with a series of radially extending grooves 23 on one face, and with a series of similar radially extending grooves 24 on its opposite face. As may best be seen in FIG. 2, the grooves 23 and 24 are disposed in staggered relation upon the opposite faces of the rotor. Secured to the rotor and overlying all but the inner portion of the grooves 23 is an annular facing member 26. A similar annular facing member 27 is secured to the opposite face of the rotor and positioned in similar relation to the grooves 24. When assembled, the element 22 of the rotor with its overlying facing members 26 and 27 extends into the narrowed peripheral chamber 28 between the member 14 and the plate 16.

The housing comprising the member 14 and its closure plate 16 define the chamber 28 and a fluid reservoir 29 which accommodates a torque transmission fluid 31 which may be of the silicone oil type. With the assembly at rest the fluid level will be approximately as shown in FIG. 1, a threaded plug 32 in the plate permitting access to the chamber for initial introduction or replacement of the fluid.

The material from which the members 26 and 27 are formed is of a somewhat porous type such as cork, brake lining material or other similar non-metallic material having similar structural and frictional characteristics. Materials such as those mentioned have fluid retaining ability, providing a "pocketing" effect, which results in a reduced coefficient of friction and consequently less heat generated at the adjacent relatively rotating surfaces of the rotor and housing.

In operation, with the rotor driven by the spindle 10 and rotating relative to the housing, the fluid will be distributed by centrifugal force within the fluid chamber 28. Torque will then be transmitted from the spindle to the housing, and consequentially to the fan blades, through the resistance to shearing stress afforded by the fluid which is disposed between the lining 26 and the adjacent facing surface of the housing member and between the lining 27 and the adjacent facing surface of the plate 16.

During the rotation of the rotor and the housing, because of the inherent slip therebetween, the rotor is moved at an angular speed somewhat greater than that of the housing. Consequently, the fluid within the grooves 23 and 24 will develop a centrifugal pressure tending to move it outwardly through the peripheral openings at the outer ends of the grooves in a path such as that indicated in FIG. 5. The generally toroidal path of circulation of the fluid is completed as it flows between the adjacent faces of the lining 26 and the member 14, and re-enters the grooves through the exposed inner ends 33 thereof. It will be understood that since the grooves 24 and the member 27 on the opposite face of the rotor are similarly formed and positioned, a similar toroidal circulation of the fluid will also occur through the grooves 24, and the fluid circulation will proceed as described upon rotation of the rotor in either direction.

The circulation of the torque transmitting fluid accomplished through the grooves in the rotor tends to transfer the frictional heat generated within the fluid, this heat being conducted through the member 14 and dissipated by means of the fins 25. The fluid circulation further serves to reduce or eliminate the occurrence of high temperatures in localized areas of the adjacent housing and rotor surfaces, and since the average temperature of the torque transmitting fluid is thereby maintained at a reduced value, the viscosity of the fluid is retained and its service life extended.

The modification of the invention, disclosed in FIGS. 6, 7, 8 and 9, is similar to the form of the invention just described, but differs from it principally in that the grooves on opposite faces of the rotor extend angularly with relation to one another.

As shown in FIG. 6, the modified form of the invention comprises a drive element or spindle 41 having a flanged end 42, adapted to be secured to a drive pulley (not shown). The housing enclosing the torque transmission elements includes a cup-shaped member 43 journaled for rotation on the spindle by means of the anti-friction bearing 44, sealed at both its ends by means of the rotary seals 46. A plate 47 closes the open end of the member 43, thereby providing a chamber 48 accommodating a torque transmitting fluid 48a. A plug 49 threaded into the plate permits access to the chamber for initial introduction or replacement of the fluid. The member 43 is provided with spaced threaded openings 50 to accommodate fan mounting bolts and is further provided with heat dissipating fins 51.

A torque plate or rotor 52, having a hub 53, is rigidly secured to the spindle adjacent its end, the rotor being thus adapted to rotate with the spindle. The rotor may be fabricated of molded plastic and is formed so as to provide a central offset element 54 and an annular peripheral element 56. As may best be seen in FIGS. 7 and 8, the element 56 of the rotor is provided with a series of circularly disposed spaced apertures 57 therethrough, and on one face of the rotor the apertures communicate with grooves 58 which extend in angular relation from the apertures to the periphery of the rotor. On the opposite face of the rotor similar grooves 59 extend between the apertures and the periphery of the rotor. It will be noted that the axes of connected grooves on opposite faces of the rotor are in opposite angular relation to each other, with the openings 57 positioned at the apex of the angle between the groove axes.

In operation, with rotation of the spindle 41, the fluid will be distributed by centrifugal force within the peripheral fluid chamber 60 surrounding the element 56 of the rotor. Torque will then be transmitted from the spindle to the housing, and consequently to the fan blades through the resistance to shearing stress afforded by the fluid which is disposed between the rotor and the facing surfaces of the member 43 and plate 47.

Referring to FIG. 8, if it is assumed that the rotor is rotating relative to the housing in a counter-clockwise direction as indicated, it will be apparent that the leading inclination of the grooves 59 will therefore cause these grooves to entrain fluid from the area adjacent the element 56 of the rotor, such fluid being forced inwardly through the grooves 59 and into the openings 57. The trailing inclination of the grooves 58 and the effects of centrifugal force will similarly result in movement of fluid outwardly toward the open ends of these grooves. Thus, as indicated in FIG. 8, the path of circulation of the fluid will be inwardly through the grooves 59, and outwardly through the grooves 58. The circulation of fluid induced by the leading and trailing disposition of the grooves 59 and 58, respectively, provides the temperature equalizing and heat dissipating effects previously referred to with reference to the form of the invention disclosed in FIG. 1.

Should the rotation of the rotor relative to the housing occur in the opposite or clockwise direction, it will be apparent that the mode of circulation of the fluid will be the same as that just described except that the inward flow of fluid will occur through the grooves 58 and the outward flow will occur in grooves 59.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a fluid coupling, the combination comprising a fluid retaining housing having spaced faces defining opposite sides of a chamber containing a supply of fluid, a rotor disposed for rotation in said chamber relative to said housing with its side surfaces extending in face-to-face relation with the faces of said housing, means for imparting relative rotation to said rotor and said housing whereby torque will be transmitted between said rotor and said housing through the shearing action of the fluid, said rotor having an annular area provided with a series of spaced apertures therethrough, a first series of grooves formed in one face of said area and extending between said apertures and the periphery of the rotor, a second series of grooves formed in the other face of said area and extending between said apertures and the periphery of the rotor, the axes of said first series of grooves leading the axes of said second series of grooves in the direction of rotation of the rotor whereby said fluid is circulated inwardly through said first series of grooves to said apertures and from said apertures outwardly through said second series of grooves.

2. In a fluid coupling, the combination comprising a fluid retaining housing having spaced faces defining opposite sides of a chamber containing a supply of fluid, a rotor disposed for rotation in said chamber relative to said housing with the side surfaces extending in face-to-face relation with the faces of said housing, means for imparting relative rotation to said rotor and said housing whereby torque will be transmitted between said rotor and said housing through the shearing action of the fluid, said rotor having a circularly arranged series of spaced apertures therethrough, a first series of grooves formed in one side surface of said rotor and extending between said apertures and the periphery of the rotor, a second series of grooves formed in the opposite side surface of said rotor and extending between said apertures and the periphery of the rotor, the axes of corresponding grooves in said first and second series being inclined angularly relative to each other with the grooves in said first series leading the grooves of said second series in the direction of rotation of said rotor, said fluid being thereby circulated inwardly through said first series of grooves to said apertures and from said apertures outwardly through said second series of grooves.

3. In a fluid coupling, the combination comprising a fluid retaining housing having spaced faces defining opposite sides of a chamber containing a supply of fluid, a rotor disposed for rotation in said chamber relative to said housing with its side surfaces extending in face-to-face relation with the faces of said housing, means for imparting relative rotation to said rotor and said housing whereby torque will be transmitted between said rotor and said housing through the shearing action of the fluid, said rotor having an annular marginal area provided with a series of spaced openings therethrough, a first series of liquid-transmitting passages formed adjacent one face of said marginal area extending between said openings and the periphery of the rotor, a second series of passages formed adjacent the other face of said marginal area extending between said openings and the periphery of the rotor, the axes of said first series of passages leading the axes of said second series of passages in the direction of rotation of the rotor whereby said fluid is circulated inwardly through said first series of passages to said openings and from said openings outwardly through said second series of passages.

4. In a fluid coupling, the combination comprising a fluid retaining housing containing a supply of fluid, a rotor disposed for rotation in said housing, means for imparting relative rotation to said rotor and said housing whereby torque will be transmitted between said rotor and said housing through the shearing action of the fluid, said rotor having an annular marginal area provided with a series of spaced apertures therethrough, a first series of grooves formed in one face of said marginal area extending between said apertures and the periphery of the rotor, a second series of grooves formed in the other face of said marginal area extending between said apertures and the periphery of the rotor, the axes of said first series of grooves leading the axes of said second series of grooves in the direction of rotation of the rotor whereby said fluid is circulated inwardly through said first series of grooves to said apertures and from said apertures outwardly through said second series of grooves.

5. In a fluid coupling, the combination comprising a fluid retaining housing containing a supply of fluid, a rotor disposed for rotation in said housing, means for imparting relative rotation to said rotor and said housing whereby torque will be transmitted between said rotor and said housing through the shearing action of the fluid, said rotor having an annular marginal area provided with a series of spaced apertures therethrough, a first series of grooves formed in one face of said marginal area extending between said apertures and the periphery of the rotor, a second series of grooves formed in the other face of said marginal area extending between said apertures and the periphery of the rotor, the axes of said first series of grooves leading the axes of said second series of grooves in the direction of relative rotation of the rotor whereby said fluid is circulated in one direction through said first series of grooves to said apertures and from said apertures in the other direction through said second series of grooves.

References Cited in the file of this patent

UNITED STATES PATENTS

| | | |
|---|---|---|
| 464,949 | Alden | Dec. 15, 1891 |
| 1,635,353 | Alley | July 12, 1927 |
| 2,046,723 | Brownscombe | July 7, 1936 |
| 2,091,409 | Lewis | Aug. 31, 1937 |
| 2,174,404 | McCune | Sept. 26, 1939 |
| 2,225,072 | Meyerhoefer | Dec. 17, 1940 |
| 2,400,225 | Eksergian | May 14, 1946 |
| 2,629,472 | Sterner | Feb. 24, 1953 |
| 2,661,825 | Winslow | Dec. 8, 1953 |
| 2,671,545 | Petroff | Mar. 9, 1954 |
| 2,690,248 | McDowall | Sept. 28, 1954 |
| 2,706,547 | Ranzi | Apr. 19, 1955 |
| 2,728,422 | Kelley | Dec. 27, 1955 |
| 2,743,792 | Ransom | May 1, 1956 |
| 2,808,140 | Trofimov | Oct. 1, 1957 |
| 2,812,648 | Croset | Nov. 12, 1957 |
| 2,813,606 | Badin | Nov. 19, 1957 |

FOREIGN PATENTS

| | | |
|---|---|---|
| 17,189 | Great Britain | of 1904 |
| 797,993 | France | Feb. 24, 1936 |